United States Patent
Roddy et al.

(10) Patent No.: US 10,708,538 B2
(45) Date of Patent: Jul. 7, 2020

(54) AIR-DIRT SEPARATOR WITH COALESCING BAFFLES

(71) Applicant: Wessels Company, Greenwood, IN (US)

(72) Inventors: Jane E. Roddy, Mooresville, IN (US); James J. Fuller, Zionsville, IN (US)

(73) Assignee: Wessels Company, Greenwood, IN (US)

( * ) Notice: Subject to any disclaimer, the term of this patent is extended or adjusted under 35 U.S.C. 154(b) by 218 days.

(21) Appl. No.: 15/842,229

(22) Filed: Dec. 14, 2017

(65) Prior Publication Data

US 2018/0169544 A1 Jun. 21, 2018

Related U.S. Application Data

(60) Provisional application No. 62/435,503, filed on Dec. 16, 2016.

(51) Int. Cl.

| | |
|---|---|
| *B01D 45/00* | (2006.01) |
| *H04N 5/77* | (2006.01) |
| *B01D 45/08* | (2006.01) |
| *B01D 45/16* | (2006.01) |
| *B01D 45/12* | (2006.01) |
| *A47L 9/16* | (2006.01) |
| *B01D 17/04* | (2006.01) |
| *B01D 21/00* | (2006.01) |
| *H04W 4/80* | (2018.01) |

(Continued)

(52) U.S. Cl.
CPC .............. *H04N 5/77* (2013.01); *A47L 9/1683* (2013.01); *B01D 17/045* (2013.01); *B01D 21/0042* (2013.01); *B01D 45/08* (2013.01); *B01D 45/12* (2013.01); *B01D 45/16* (2013.01); *B01D 50/002* (2013.01); *F01M 13/04* (2013.01); *H04W 4/80* (2018.02)

(58) Field of Classification Search
CPC ....... H04N 5/77; A47L 9/1683; B01D 17/045; B01D 21/0042; B01D 45/08; B01D 50/002; B01D 45/16; B01D 45/12; H04W 4/80; F01M 13/04
See application file for complete search history.

(56) References Cited

U.S. PATENT DOCUMENTS

| | | | |
|---|---|---|---|
| 420,136 A | 1/1890 | Willis | |
| 692,390 A * | 2/1902 | Waggoner | B01D 45/08 55/423 |

(Continued)

FOREIGN PATENT DOCUMENTS

| | | |
|---|---|---|
| DE | 29518738 U1 | 7/1996 |
| EP | 0633807 B1 | 1/1997 |

(Continued)

OTHER PUBLICATIONS

Micro Air Bubbles Separator in Combination with Sludge Separation, Spirotech, Spirovent, 4 pages.

(Continued)

*Primary Examiner* — Dung H Bui
(74) *Attorney, Agent, or Firm* — Barnes & Thornburg LLP

(57) ABSTRACT

An air-dirt separator adapted to reduce entrained air and separate debris from fluid moving through the air-dirt separator is described in the present disclosure. The air-dirt separator includes a housing and coalescing baffles mounted in the housing.

18 Claims, 4 Drawing Sheets

(51) Int. Cl.
B01D 50/00 (2006.01)
F01M 13/04 (2006.01)

(56) References Cited

U.S. PATENT DOCUMENTS

| | | | | |
|---|---|---|---|---|
| 1,632,325 | A * | 6/1927 | Anderson | B01D 45/08 |
| | | | | 55/446 |
| 1,739,093 | A * | 12/1929 | Ruby | B01D 46/12 |
| | | | | 55/419 |
| 2,798,613 | A | 7/1957 | Tinker | |
| 2,925,913 | A | 2/1960 | Wheeler, Jr. | |
| 3,060,693 | A | 10/1962 | Taylor | |
| 3,256,995 | A | 6/1966 | Schmid et al. | |
| 3,266,224 | A * | 8/1966 | Ferretti | B01D 47/028 |
| | | | | 96/326 |
| 3,473,663 | A | 10/1969 | Winslow | |
| 3,483,678 | A * | 12/1969 | Cioffi | B04C 5/28 |
| | | | | 55/348 |
| 3,559,760 | A * | 2/1971 | Ninomiya | F01N 1/083 |
| | | | | 181/231 |
| 3,668,822 | A | 6/1972 | Mannion et al. | |
| 3,747,347 | A * | 7/1973 | Ciraolo | F01N 1/083 |
| | | | | 60/309 |
| 3,819,052 | A | 6/1974 | Firth | |
| 3,854,906 | A | 12/1974 | Roffelsen | |
| 4,027,691 | A | 6/1977 | Roffelsen | |
| 4,051,033 | A | 9/1977 | Blace | |
| 4,105,422 | A * | 8/1978 | Kiguchi | B01D 45/06 |
| | | | | 126/299 D |
| 4,283,209 | A * | 8/1981 | Schmalhofer | B01D 45/08 |
| | | | | 126/299 D |
| 4,334,897 | A * | 6/1982 | Brady | B01D 53/18 |
| | | | | 261/109 |
| 4,341,540 | A * | 7/1982 | Howerin | A47L 7/0014 |
| | | | | 15/353 |
| 4,358,299 | A | 11/1982 | Jensen et al. | |
| 4,381,928 | A | 5/1983 | Roffelsen | |
| 4,387,603 | A * | 6/1983 | Nelson | B01D 45/08 |
| | | | | 73/863.22 |
| 4,416,673 | A * | 11/1983 | Kirchen | C21B 7/00 |
| | | | | 266/157 |
| 4,427,421 | A | 1/1984 | Jensen et al. | |
| 4,443,346 | A | 4/1984 | Muller | |
| 4,456,172 | A | 6/1984 | Roffelsen | |
| 4,526,689 | A | 7/1985 | Morgan | |
| 4,627,406 | A * | 12/1986 | Namiki | F01M 13/04 |
| | | | | 123/572 |
| 4,645,518 | A | 2/1987 | Roffelsen | |
| 4,717,404 | A * | 1/1988 | Fore | B01D 45/08 |
| | | | | 55/357 |
| 4,718,922 | A | 1/1988 | Roffelsen | |
| 4,744,958 | A * | 5/1988 | Pircon | B01D 45/08 |
| | | | | 261/116 |
| H000529 | H * | 10/1988 | Patel | 244/118.5 |
| 4,818,389 | A | 4/1989 | Tobias et al. | |
| 4,877,431 | A * | 10/1989 | Avondoglio | B01D 45/04 |
| | | | | 55/321 |
| 4,985,182 | A | 1/1991 | Basse et al. | |
| 5,123,938 | A | 6/1992 | Nobel | |
| 5,149,347 | A * | 9/1992 | Turner | B01D 45/08 |
| | | | | 55/446 |
| 5,443,724 | A | 8/1995 | Williamson et al. | |
| 5,470,364 | A * | 11/1995 | Adiletta | B32B 5/26 |
| | | | | 55/484 |
| 5,490,874 | A | 2/1996 | Kuster et al. | |
| 5,500,132 | A | 3/1996 | Elmi | |
| 5,601,635 | A | 2/1997 | Roffelsen | |
| 5,676,740 | A | 10/1997 | Schwartz et al. | |
| 5,693,383 | A | 12/1997 | Basse et al. | |
| 5,713,970 | A * | 2/1998 | Raring | B01D 45/10 |
| | | | | 55/511 |
| 5,772,870 | A | 6/1998 | Basse | |
| 5,882,510 | A | 3/1999 | Basse et al. | |
| 6,062,767 | A | 5/2000 | Kizhnerman et al. | |
| 6,171,379 | B1 * | 1/2001 | Rolland | B01D 45/08 |
| | | | | 55/434.2 |
| 6,183,541 | B1 * | 2/2001 | Compton | B01D 53/18 |
| | | | | 95/221 |
| 6,214,096 | B1 * | 4/2001 | Kwak | B01D 19/0042 |
| | | | | 96/165 |
| 6,241,881 | B1 | 6/2001 | Pezzaniti | |
| 6,576,045 | B2 * | 6/2003 | Liu | F01N 3/0215 |
| | | | | 55/323 |
| 6,860,994 | B2 | 3/2005 | Graves | |
| 6,893,485 | B2 | 5/2005 | MacDuff | |
| 6,913,155 | B2 | 7/2005 | Bryant | |
| 7,182,874 | B2 | 2/2007 | Allard et al. | |
| 7,282,142 | B2 | 10/2007 | Kraft | |
| 7,445,711 | B2 | 11/2008 | Pas et al. | |
| 7,699,984 | B2 | 4/2010 | Andoh et al. | |
| 7,799,235 | B2 | 9/2010 | Olson et al. | |
| 7,927,404 | B2 * | 4/2011 | Kemoun | B01J 8/226 |
| | | | | 422/147 |
| 8,177,975 | B2 | 5/2012 | Schipper | |
| 8,313,658 | B2 | 11/2012 | Cnossen | |
| 8,398,757 | B2 | 3/2013 | Iijima et al. | |
| 9,346,174 | B2 | 5/2016 | Adachi | |
| 9,427,680 | B2 | 8/2016 | Cnossen et al. | |
| 2003/0150198 | A1 * | 8/2003 | Illingworth | A47L 5/24 |
| | | | | 55/406 |
| 2003/0221560 | A1 | 12/2003 | MacDuff | |
| 2004/0103786 | A1 * | 6/2004 | Hiltunen | B01D 45/12 |
| | | | | 95/271 |
| 2006/0096259 | A1 * | 5/2006 | Meerpohl | B01D 29/01 |
| | | | | 55/482 |
| 2010/0236409 | A1 | 9/2010 | Cnossen | |
| 2010/0326025 | A1 * | 12/2010 | Bratton | B01D 45/06 |
| | | | | 55/440 |
| 2012/0097039 | A1 | 4/2012 | Vandenbulcke | |
| 2013/0126448 | A1 * | 5/2013 | McCabe | B01D 19/0036 |
| | | | | 210/801 |
| 2014/0020498 | A1 | 1/2014 | Adachi | |
| 2014/0048495 | A1 | 2/2014 | Cnossen et al. | |
| 2014/0096683 | A1 * | 4/2014 | Azwell | B01D 46/2403 |
| | | | | 95/268 |
| 2015/0040767 | A1 * | 2/2015 | Sugio | B01D 45/08 |
| | | | | 96/417 |
| 2015/0123297 | A1 | 5/2015 | Park | |
| 2016/0288035 | A1 * | 10/2016 | Pereira | B01D 45/08 |
| 2017/0036149 | A1 * | 2/2017 | Barley | B01D 45/08 |

FOREIGN PATENT DOCUMENTS

| | | |
|---|---|---|
| EP | 0859655 B1 | 1/2000 |
| EP | 2463444 A1 | 6/2012 |
| EP | 2258461 B1 | 1/2015 |
| JP | 2005337123 A * | 12/2005 |
| WO | 2016182761 A1 | 11/2016 |

OTHER PUBLICATIONS

Automatische Luft—& Schlammabscheider für Heizungs-, Kühlund Prozessanlagen, Spirotech, Spirocombi, 8 pages.
Spirovent, Spirotrap, Spirocombi, 28 pages.
Microbubble Deaerators and Dirt Separators, Spriovent, Spriovent Air & Dirt, 6 pages.
Wess-Vent Air & Dirt Separators, Wessels Company, Premium Performance, 1 page.
Wess-Vent Air & Dirt Separators, Choose High Velocity (WVA-HV) for Optimum Performance, 1 page.

* cited by examiner

AIR-DIRT SEPARATOR WITH COALESCING BAFFLES

CROSS REFERENCE TO RELATED APPLICATIONS

This application claims priority to and the benefit of U.S. Provisional Patent Application No. 62/435,303, filed 16 Dec. 2016, the disclosure of which is now expressly incorporated herein by reference.

BACKGROUND

Air-dirt separators are designed to reduce entrained air and separate debris from fluid moving through the air-dirt separator. In many air-dirt separators, an internal coalescing device facilitates the separation of air and dirt from the flow of a fluid.

SUMMARY

The present disclosure may comprise one or more of the following features and combinations thereof.

An air-dirt separator adapted for use in a hydronic system is disclosed in this paper. The air-dirt separator may include a housing and a plurality of coalescing baffles. The housing may have an inlet and an outlet each adapted to be fluidly coupled to a line. The housing may be shaped to define an internal cavity arranged between the inlet and the outlet. The plurality of coalescing baffles may be configured to encourage the separation of air and dirt from fluid flow moving through the air-dirt separator.

In illustrative embodiments, the plurality of coalescing baffles may be arranged in the internal cavity of the housing. Each of the plurality of coalescing baffles may be perforated with holes. The plurality of coalescing baffles may be arranged to define a tortuous primary flow path through the internal cavity from the inlet to the outlet of the housing.

In illustrative embodiments, the tortuous primary flow path through the internal cavity may extend upwardly above and downwardly below both the inlet and the outlet. Each of the plurality of coalescing baffles may be formed from a flat sheet bent to form a zig-zag shape.

In illustrative embodiments, the coalescing baffles may be arranged so that the primary flow path expands and contracts to change the pressure and velocity fluid flow moving through the air-dirt separator. The holes formed in the plurality of coalescing baffles may extend perpendicular to planes defined by individual sections of each coalescing baffles and may be sized such that during use a secondary flow of fluid, smaller than a primary flow of fluid moving through the tortuous primary flow path, moves through the holes to create turbulence in the primary flow of fluid.

In illustrative embodiments, the air-dirt separator may include a support cage. The support cage may be coupled to each of the plurality of coalescing baffles and may be configured to hold the plurality of coalescing baffles in place within the internal cavity relative to the inlet and the outlet of the housing.

These and other features of the present disclosure will become more apparent from the following description of the illustrative embodiments.

DETAILED DESCRIPTION

Figure 1:
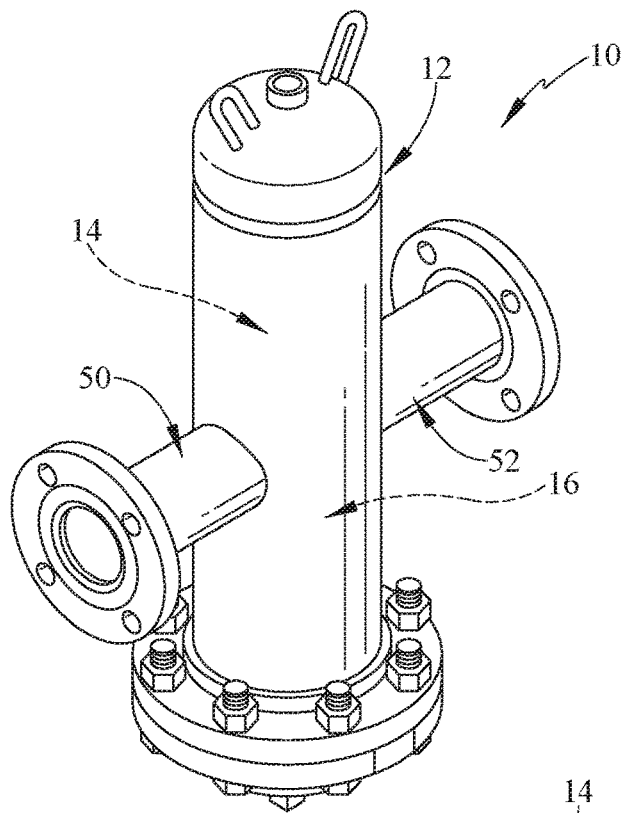
FIG. 1 is a perspective view of an illustrative air-dirt separator according to the present disclosure that includes a housing that supports coalescing baffles in a fluid flow path.

For the purposes of promoting an understanding of the principles of the disclosure, reference will now be made to a number of illustrative embodiments illustrated in the drawings and specific language will be used to describe the same.

Figure 2:
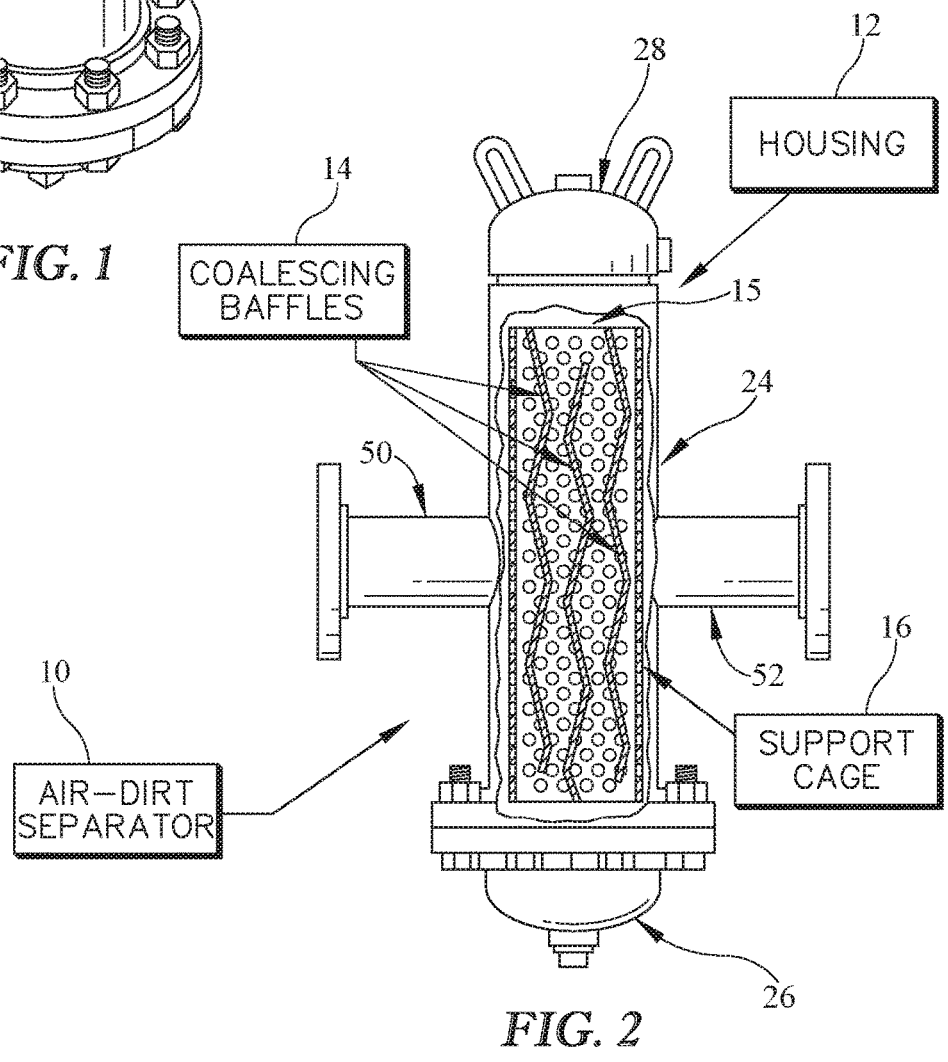
FIG. 2 is a side elevation view of the air-dirt separator of FIG. 1 with a portion of the housing broken away to expose the coalescing baffles.
Figure 3:
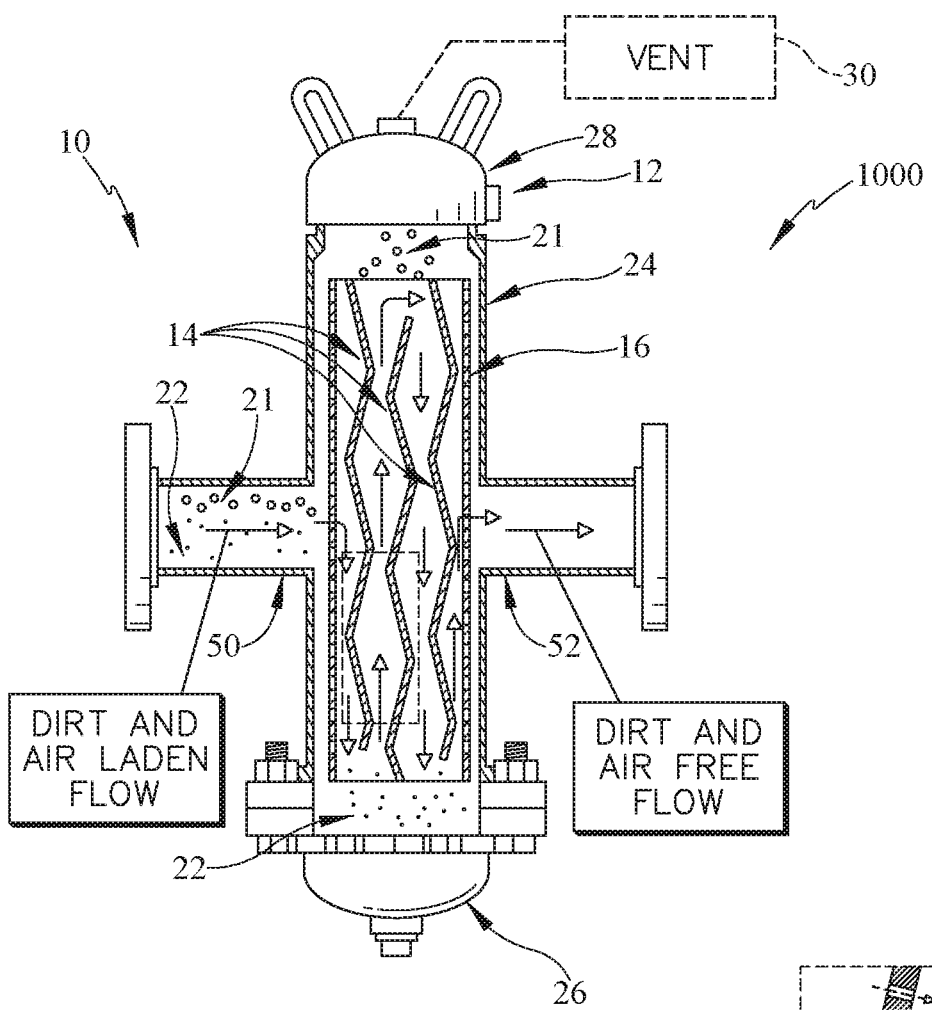
FIG. 3 is a side elevation view of the air-dirt separator of FIGS. 1 and 2 mounted in a hydronic system showing air and dirt removed from a fluid flow as the fluid moves along a tortuous primary flow path defined by the coalescing baffles that expands and contracts to change the pressure and velocity of a primary fluid flow moving through the air-dirt separator.

An illustrative air-dirt separator 10 shown in FIG. 1 is adapted to reduce entrained air and separate debris from fluid moving through the air-dirt separator 10 as suggested in FIG. 3. The air-dirt separator 10 includes a housing 12, coalescing baffles 14, and a support cage 16 as shown in FIG. 2. The housing 12 defines an internal cavity 15 that receives the coalescing baffles 14 and the support cage 16 and through which fluid flows when the air-dirt separator 10 is in use. The coalescing baffles 14 are configured to cause air 21 within a fluid flow to agglomerate for venting and to separate dirt 22 within the fluid flow to fall to the bottom of the air-dirt separator 10 for removal as suggested in FIG. 3. The support cage 16 supports the coalescing baffles 14 in place within the internal cavity 15.

The housing 12 is configured to conduct a flow of fluid moving through a hydronic system 1000 such that the flow of fluid interacts with the coalescing baffles 14 as suggested in FIG. 3. The housing 12 illustratively includes a filter receiver 24, a receiver floor 26, and a receiver cap 28. The filter receiver 24 is illustratively a cylindrical tube that receives the coalescing baffles 14 and the support cage 16 in an internal cavity 15. The receiver floor 26 is coupled to the bottom of the filter receiver 24 and is removable to allow dirt 22 collected on the receiver floor 26 during use of the air-dirt separator 10 to be removed. The receiver cap 28 is coupled to the top of the filter receiver 24 and is adapted to be fitted with a vent 30 that releases air 21 that collects in the receiver cap 28.

In the illustrative embodiment, the housing 12 further includes an inlet 50 and an outlet 52 that open into the internal cavity 15 as shown in FIGS. 1-3. The inlet 50 is arranged directly opposite and aligned with the outlet 52 in the exemplary embodiment along a line that runs perpendicular to the primary axis of the cylindrical tube that provides the filter receiver 24. In other embodiments, the inlet 50 and the outlet 52 may be misaligned.

The coalescing baffles 14 cooperate to define a tortuous primary flow path for fluid flow moving through the air-dirt separator 10 as shown in FIGS. 2 and 3. The coalescing baffles 14 are each flat sheets of metallic material bent to form a zig-zag shape. The coalescing baffles 14 are arranged so that the primary flow path expands and contracts to change the pressure and velocity fluid flow moving through the air-dirt separator 10. During use, a primary flow 25 of fluid moves along the primary flow path moving downwardly and upwardly across the internal cavity 15 from the inlet 50 to the outlet 52 of the housing 12 while interacting with the coalescing baffles 14.

Figure 4:
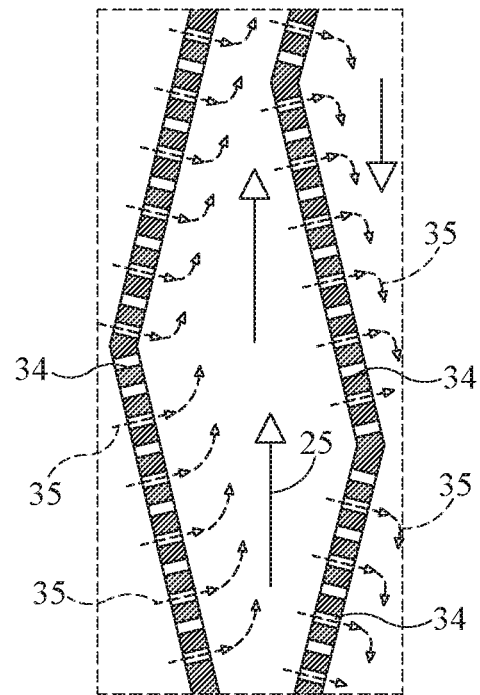
FIG. 4 is a detail view of a portion of FIG. 3 showing that the coalescing baffles formed to include relatively small perforations adapted to create secondary flow paths through coalescing baffles such that turbulent flow of the fluid is induced.
Figure 5:
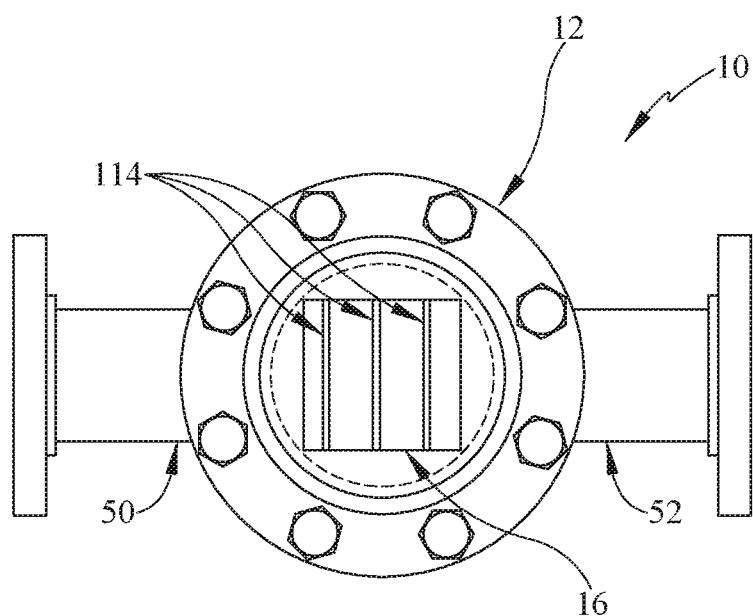
FIG. 5 is a top plan view of the air-dirt separator of FIGS. 1-4 with a receiver cap of the housing removed to show a support cage included in the air-dirt separator that holds the coalescing baffles in place within the housing.
Figure 6:
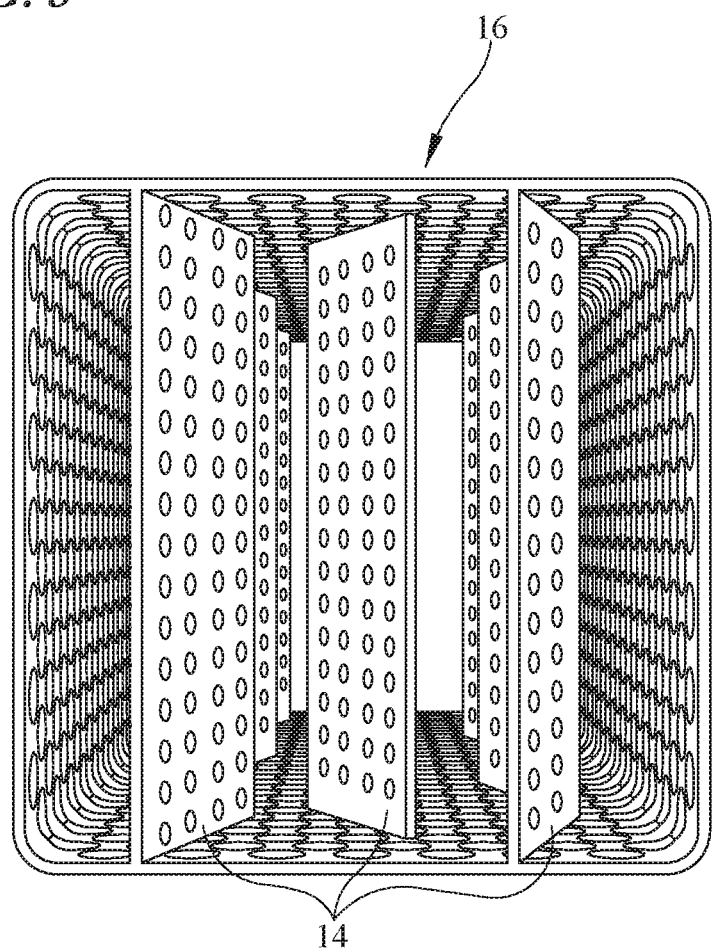
FIG. 6 is a top perspective view of the coalescing baffles and the support cage showing that the support cage is rectangular and that the coalescing baffles extend across the support cage.

In the illustrative embodiment, the coalescing baffles 14 are perforated with holes 34 as shown in FIG. 4. The holes 34 are relatively small and extend perpendicular to planes defined by individual sections 141, 142, 143, 144 of coalescing baffles 14. During use, small amounts of secondary flow 35 move through the holes 35 to create turbulence in the primary flow 25 before rejoining the primary flow 25.

Figure 7:
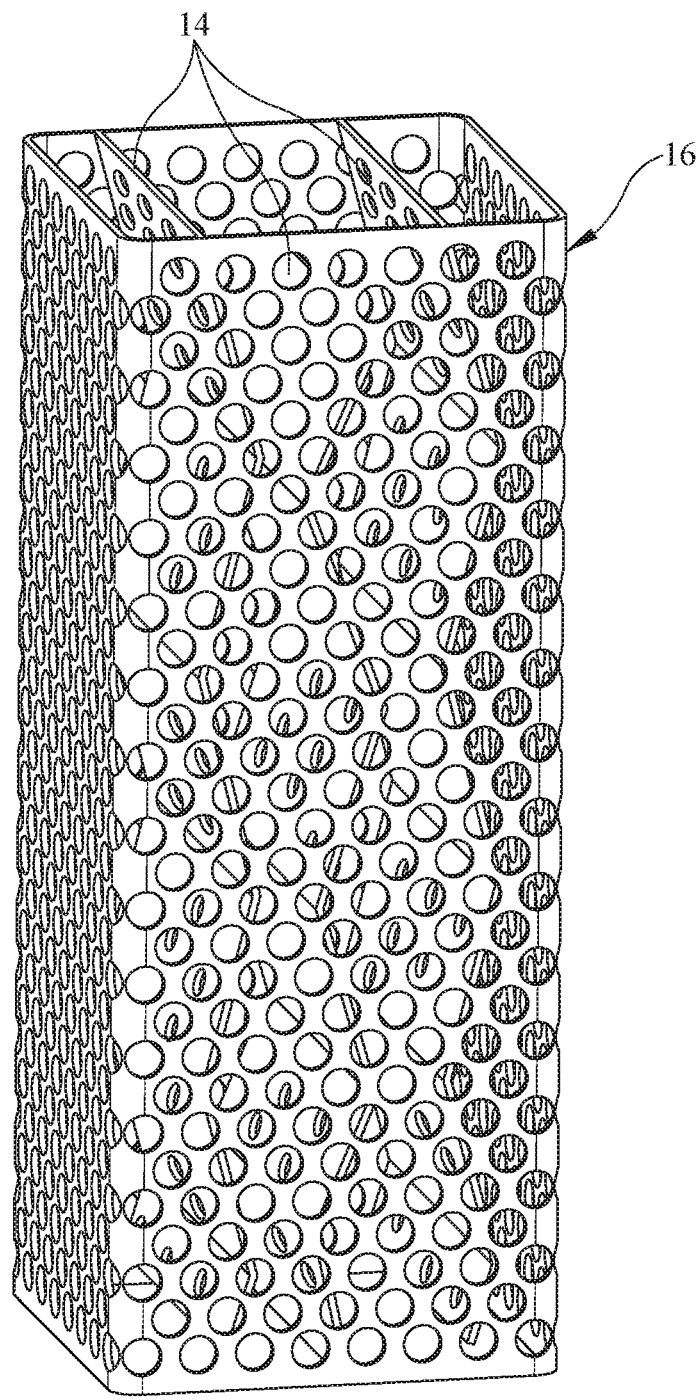
FIG. 7 is a side perspective view of the coalescing baffles and the support cage showing that the support cage is formed to include large apertures configured to allow a primary flow of fluid to pass through the cage toward the coalescing baffles.

The support cage 16 supports the coalescing baffles 14 in place within the internal cavity 15 as suggested in FIGS. 2-6. The support cage 16 has a rectangular shape when viewed from above and the coalescing baffles 14 extend across the support cage 16 to allow for tack welding of the components along the sides of the coalescing baffles 14. The support cage 16 is formed to include large apertures 40 as shown in FIG. 7. The apertures 40 are larger than the holes 34 of the coalescing baffles 14 and generally do not interrupt primary flow 25 of fluid passing through the air-dirt separator 10.

In operation, a dirt and air-laden flow of liquid moves into the air dirt separator 10 via the inlet 50 as suggested in FIG. 3. Upon motion through the inlet 50, the flow moves into the internal cavity 15 of the filter receiver and begins interaction with the coalescing baffles 14.

Upon interaction with the coalescing baffles 14, the primary flow 25 moves along the primary flow path moving downwardly and upwardly across the internal cavity 15 from the inlet 50 to the outlet 52 of the housing 12. In addition, during interaction with the coalescing baffles 14, the secondary flow 35 moves through the holes 35 to create turbulence in the primary flow 25. As a result of interaction with the coalescing baffles 14, air 21 in the flow is driven together to form larger bubbles and is directed upwardly and out via vent 30 and dirt 22 in the flow is driven downwardly.

After movement through the internal cavity 15, a dirt and air free flow of fluid is discharged from the air-dirt separator 10 via the outlet 52 as suggested in FIG. 3. It is appreciated that some air or dirt may remain upon discharge but the amounts are appreciated to be significantly reduced.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An air-dirt separator adapted for use in a hydronic system, the air-dirt separator comprising a housing having an inlet and an outlet each adapted to be fluidly coupled to a line, the housing shaped to define an internal cavity arranged between the inlet and the outlet, and a plurality of coalescing baffles arranged in the internal cavity of the housing, each of the plurality of coalescing baffles perforated with holes and arranged to define a tortuous primary flow path through the internal cavity from the inlet to the outlet of the housing, wherein each of the plurality of coalescing baffles is formed from a flat sheet that is bent to form a zig-zag shape to expand and contract the primary flow path and change the pressure and velocity of the fluid flow moving through the air-dirt separator, and wherein the inlet and the outlet are arranged along a common axis and each of the coalescing baffles extends toward the inlet and toward the outlet as each coalescing baffle extends transversely to the common axis from below the inlet and the outlet to above the inlet and the outlet.

2. The air-dirt separator of claim 1, wherein the tortuous primary flow path through the internal cavity extends upwardly above and downwardly below both the inlet and the outlet.

3. The air-dirt separator of claim 1, wherein the holes formed in the plurality of coalescing baffles extend perpendicular to planes defined by individual sections of each coalescing baffles and are sized such that during use a secondary flow of fluid, smaller than a primary flow of fluid moving through the tortuous primary flow path, moves through the holes to create turbulence in the primary flow of fluid.

4. The air-dirt separator of claim 1, further comprising a support cage coupled to each of the plurality of coalescing baffles and configured to hold the plurality of coalescing baffles in place within the internal cavity relative to the inlet and the outlet of the housing.

5. The air-dirt separator of claim 4, wherein the support cage is formed to include apertures larger than the holes formed in the plurality of coalescing baffles.

6. The air-dirt separator of claim 4, wherein the support cage has a rectangular shape when viewed from above and the plurality of coalescing baffles extend across the support cage when viewed from above.

7. The air-dirt separator of claim 4, wherein the support cage is taller from bottom to top than any individual one of the plurality of coalescing baffles.

8. An air-dirt separator adapted for use in a hydronic system, the air-dirt separator comprising a housing having an inlet and an outlet each adapted to be fluidly coupled to a line, the housing shaped to define an internal cavity arranged between the inlet and the outlet, and a plurality of coalescing baffles arranged in the internal cavity of the housing, each of the plurality of coalescing baffles perforated with holes and shaped to provide a zig-zag shape, wherein the zig-zag shape of the coalescing baffles define a tortuous primary flow path through the internal cavity and the plurality of coalescing baffles are arranged to expand and contract the primary flow path between the inlet and the outlet, and wherein the inlet and the outlet are arranged along a common axis and each of the coalescing baffles extends toward the inlet and toward the outlet as each coalescing baffle extends transversely to the common axis from below the inlet and the outlet to above the inlet and the outlet.

9. The air-dirt separator of claim 8, wherein each of the plurality of coalescing baffles is formed from a bent sheet of material.

10. The air-dirt separator of claim 8, wherein the plurality of coalescing baffles are each formed to include holes, and the holes formed in the plurality of coalescing baffles extend perpendicular to planes defined by individual sections of each coalescing baffles.

11. The air dirt separator of claim 8, wherein the support cage is coupled to each of the plurality of coalescing baffles via weld joints.

12. The air-dirt separator of claim 8, further comprising a support cage configured to hold the plurality of coalescing baffles in place within the internal cavity.

13. The air-dirt separator of claim 12, wherein the support cage is formed to include apertures larger than the holes formed in the plurality of coalescing baffles.

14. The air-dirt separator of claim 13, wherein the support cage has a rectangular shape when viewed from above and the plurality of coalescing baffles extend across the support cage when viewed from above.

15. The air-dirt separator of claim 14, wherein the support cage is taller from bottom to top than any individual one of the plurality of coalescing baffles.

16. An air-dirt separator adapted for use in a hydronic system, the air-dirt separator comprising a housing having an inlet and an outlet each adapted to be fluidly coupled to a line, the housing shaped to define an internal cavity arranged between the inlet and the outlet, and a plurality of coalescing baffles arranged in the internal cavity of the housing, each of the plurality of coalescing baffles perforated with holes and having a first portion that extends in a first direction, a second portion that extends in a second direction different than the first direction, and a bend that interconnects the first portion and the second portion to provide a zig-zag shape defined by the first portion, the second portion, and the bend, wherein the inlet and the outlet are arranged along a common axis and each of the coalescing baffles extends toward the inlet and toward the outlet as each coalescing baffle extends transversely to the common axis from below the inlet and the outlet to above the inlet and the outlet.

17. The air-dirt separator of claim 16, wherein one of the first direction and the second direction is toward the inlet and the other of the first direction and the second direction is toward the outlet.

18. The air-dirt separator of claim 16, wherein a first coalescing baffle included in the plurality of coalescing baffles extends toward the inlet in the first direction and toward the outlet in the second direction and a second coalescing baffle included in the plurality of baffles and neighboring the first coalescing baffle extends toward the outlet in the first direction and toward the inlet in the second direction.

* * * * *